(12) United States Patent
Patwardhan

(10) Patent No.: US 9,586,493 B2
(45) Date of Patent: Mar. 7, 2017

(54) HANDS FREE CONDUCTIVE CHARGING SYSTEM FOR ELECTRIC VEHICLES

(71) Applicant: Satyajit Patwardhan, Fremont, CA (US)

(72) Inventor: Satyajit Patwardhan, Fremont, CA (US)

( * ) Notice: Subject to any disclaimer, the term of this patent is extended or adjusted under 35 U.S.C. 154(b) by 279 days.

(21) Appl. No.: 14/187,321

(22) Filed: Feb. 24, 2014

(65) Prior Publication Data

US 2014/0239890 A1 Aug. 28, 2014

Related U.S. Application Data

(60) Provisional application No. 61/769,935, filed on Feb. 27, 2013.

(51) Int. Cl.
*B60L 11/00* (2006.01)
*B60L 11/18* (2006.01)

(52) U.S. Cl.
CPC ....... *B60L 11/1827* (2013.01); *B60L 11/1818* (2013.01); *B60L 11/1824* (2013.01); *B60L 11/1833* (2013.01); *B60L 11/1829* (2013.01); *B60L 2200/26* (2013.01); *Y02T 10/7005* (2013.01); *Y02T 10/7072* (2013.01); *Y02T 90/121* (2013.01); *Y02T 90/125* (2013.01); *Y02T 90/14* (2013.01)

(58) Field of Classification Search
None
See application file for complete search history.

(56) References Cited

U.S. PATENT DOCUMENTS

| | | | |
|---|---|---|---|
| 3,955,657 A | 5/1976 | Bossi | |
| 4,904,142 A * | 2/1990 | Sato | B63G 3/04 212/299 |
| 5,458,171 A * | 10/1995 | Ward | B27F 1/08 144/144.1 |
| 5,462,439 A * | 10/1995 | Keith | B60L 1/08 180/279 |
| 5,573,090 A | 11/1996 | Ross | |
| 5,821,731 A | 10/1998 | Kuki et al. | |
| 6,640,426 B2 * | 11/2003 | Sonnichsen | H01R 43/205 254/88 |

(Continued)

*Primary Examiner* — Leigh Garbowski

(57) ABSTRACT

The general field of this invention is electrical connectors and their actuating mechanism. More specifically, this invention teaches a novel connector and its actuating mechanism for establishing an electrical connection between two arbitrarily oriented objects such as an arbitrarily parked EV and infrastructure. In most of the prior art, a conductive connection requires precise and guided alignment of mating conductors. The prior art achieves this either by a sensor guided search or mechanical guides to being the two objects into desired alignment. In order to tolerate a wider misalignment between the two objects, the guides have to have a large footprint. In contrast, this invention breaks down the process of aligning the two halves of connector into a series of simple motions—when carried out in a particular order, would deliver the necessary alignment of the two sides of a connector. The series of motions also ensure sliding of conductive elements against each other under force to mimic a pin and socket contact, thus establishing a high quality conductive connection between the two misaligned objects.

9 Claims, 5 Drawing Sheets

(56) References Cited

U.S. PATENT DOCUMENTS

| | | | |
|---|---|---|---|
| 7,023,177 B1 | 4/2006 | Bussinger | |
| 8,307,967 B2 | 11/2012 | Patwardhan | |
| 8,807,308 B2 * | 8/2014 | Suh .................... | B60L 11/1803 191/10 |
| 8,937,454 B2 * | 1/2015 | Baarman ............... | B60L 11/182 180/65.1 |
| 9,077,191 B2 * | 7/2015 | Peiker ................... | H02J 7/0044 |
| 9,143,001 B2 * | 9/2015 | Nakayama .............. | H02J 17/00 |
| 2012/0119708 A1 * | 5/2012 | Toya ....................... | H01F 38/14 320/137 |
| 2013/0249470 A1 * | 9/2013 | Martin .................. | B60L 11/182 320/107 |
| 2013/0313913 A1 * | 11/2013 | Ichikawa .............. | B60L 11/182 307/104 |
| 2013/0335018 A1 * | 12/2013 | Ichikawa .............. | B60L 11/182 320/108 |
| 2014/0125140 A1 * | 5/2014 | Widmer .................. | H02J 7/025 307/104 |
| 2015/0114236 A1 * | 4/2015 | Roy ........................ | A47J 44/00 426/231 |
| 2015/0224882 A1 * | 8/2015 | Brill ..................... | B60L 11/182 320/108 |

\* cited by examiner

HANDS FREE CONDUCTIVE CHARGING SYSTEM FOR ELECTRIC VEHICLES

FIELD OF THE INVENTION

The general field of this invention is electrical connectors and their actuating mechanism. With the rebirth of electric vehicles (EVs), the problem of charging of an EV without human intervention has become a critical element in successful deployment of EVs. This invention addresses the problem of establishing a conductive electrical connection between two arbitrarily misaligned objects—such as an arbitrarily parked EV and infrastructure—such as a home garage.

PRIOR ART RELATED TO THE INVENTION

The conductive connection schemes taught in prior art are: (i) Manual alignment and mating of two connector halves (see e.g. SAE standard J-1772), (ii) Sensor guided search for locating the two connector halves (see e.g. U.S. Pat. No. 5,821,731), (iii) Mechanical guides for homing-in either the entire vehicle or portions of it (see e.g. U.S. Pat. No. 7,023,177), (iv) Large size conductor rails (see e.g. U.S. Pat. No. 3,955,657).

(i) The manual charge couplers—although ubiquitous, simple and efficient, need the driver of the EV to undertake the act of plugging in. The novelty of the invention presented in this patent is that it enables charging without the human intervention.

(ii) Sensor guided search depends on electronic sensors with increased system complexity as well as reduced reliability.

(iii), (iv) Car wash style homing guides and railroad style large conductors become impractical solutions for a home garage due to their large size and intrusive footprint.

Finally, the prior art in the field also describes inductive charging as a way of transferring electrical energy to and EV (see e.g. U.S. Pat. No. 5,573,090, and SAE standard J-2954). Such inductive energy transfer does not require a precise alignment of the two objects across which energy is being transferred. However this works well for low power levels such as a toothbrush or a cell phone, but creates prohibitive problems when scaled to the power levels necessary for typical EV charging. To begin, according to the Faraday's law of induction, the large oscillating magnetic field produced by inductive power transfer induces currents in mammalian neural system—creating what is essentially equivalent of an electric shock. Secondly, the same magnetic field also generates heat (i) in most conductive objects by the mechanism called as inductive heating, and additionally (ii) in most ferromagnetic materials by the mechanism of hysteresis losses. Lastly, the inductive scheme suffers from low transfer efficiency and at the energy levels of an EV, ends up losing a substantial amount of electricity daily. This increases the carbon footprint of EVs and dilutes their environmental benefits.

A conductive, hands free scheme for connecting an EV to the infrastructure is thus important and has been sought by the industry without much success until recently. A first practical solution was recently presented in U.S. Pat. No. 8,307,967. This scheme utilizes multiple redundant conductors to compensate for the vehicle misalignment.

The novel scheme presented in this patent application is yet another practical approach to hands free conductive charging of EVs. In contrast to U.S. Pat. No. 8,307,967—which uses multiple redundant contacts to eliminate robotic search or guides, this patent breaks down the operation of mating the two sides of a connector into a sequence of simple motions to be carried out in a particular order. Each of these motions utilizes the configuration created by the motion preceding it. Another novelty of the scheme is that both sides of the connector share the burden of motion and hence the mechanical footprint on infrastructure side as well as on the vehicle side is balanced and moderate. Finally, the innovation also ensures that the conductors for the two sides mate and slide with respect to each other under force—thus simulating the much desired pin-and-socket connection.

DETAILED DESCRIPTION OF THE INVENTION

Figure 1:
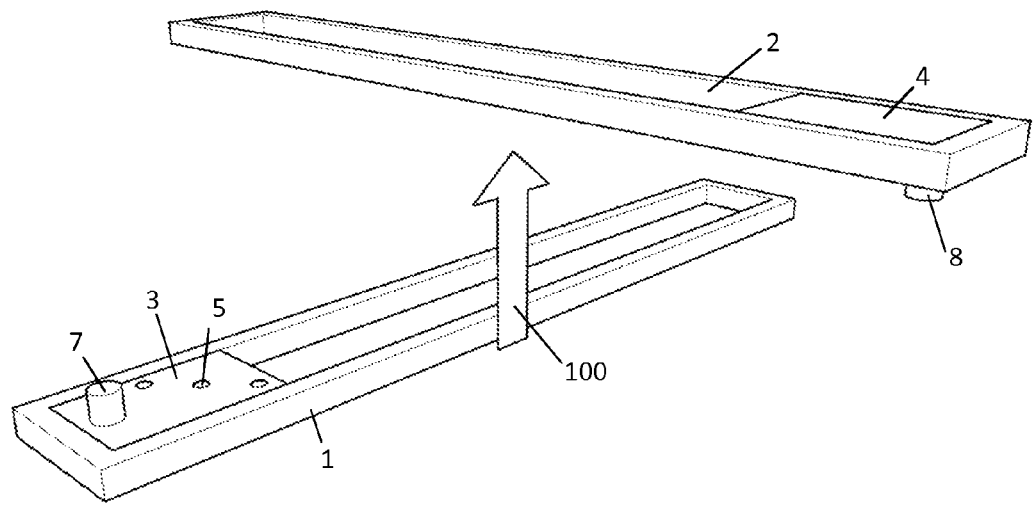
FIG. 1: Cross-Frames in disengaged position showing connector block.
Figure 2:
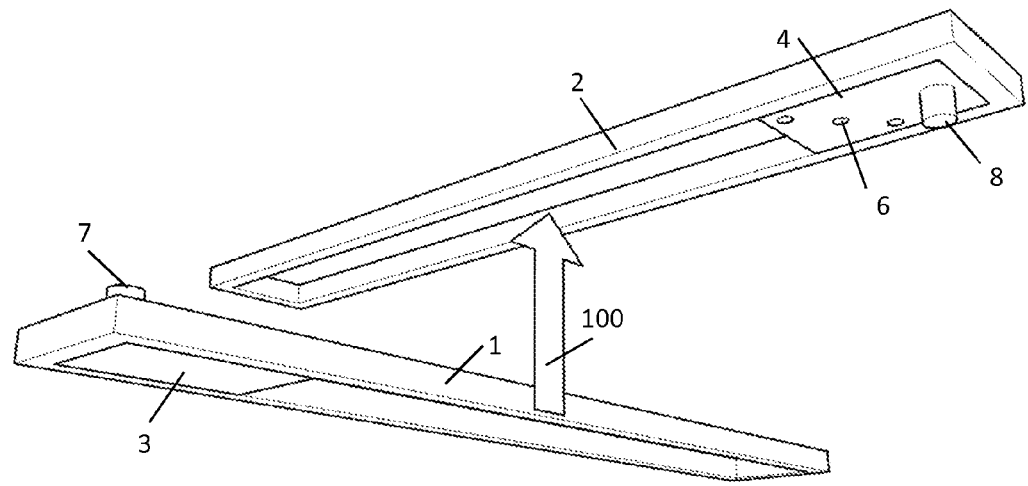
FIG. 2: Alternate view of Cross-Frames in disengaged position showing connector block

FIG. 1 shows core components for establishing an electrical connection between two objects. It comprises of a long frame 1 and a connector block 3 that can slide inside the frame 1. The frame 1 and its connector block are attached to first object such as the garage floor. The connector block 3 carries the electrical contacts 5. A second frame 2 is attached to the second object such as an EV and carries a connector block 4 that can slide in the frame 2. The connector block 4 carries electrical contacts 6 (see FIG. 2). The goal of this invention is to establish a physical connection between contacts 5 and 6 by aligning them and bringing them together. Each of the connector blocks 3 and 4 also carry stopper pins 7 and 8 respectively.

Figure 3:
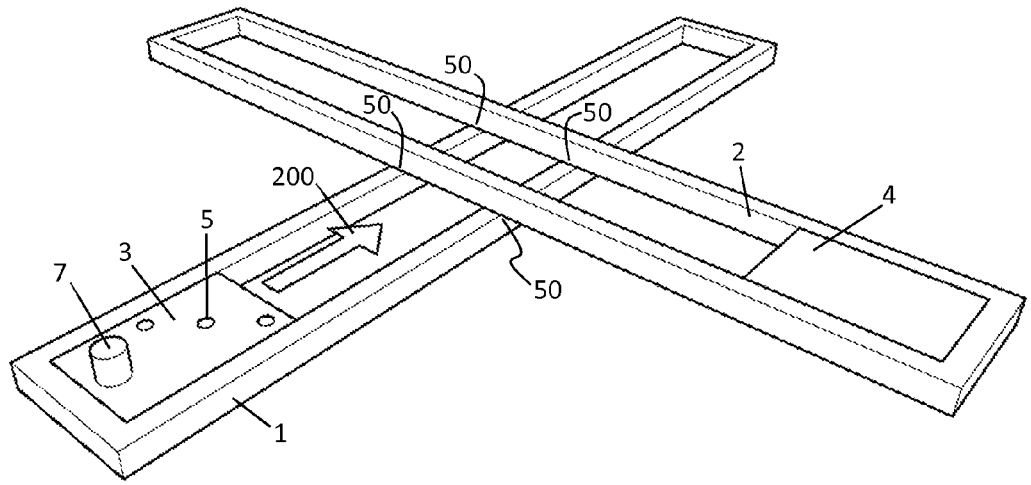
FIG. 3: View of Cross-Frames in engaged position and connector blocks in disengaged position.
Figure 4:
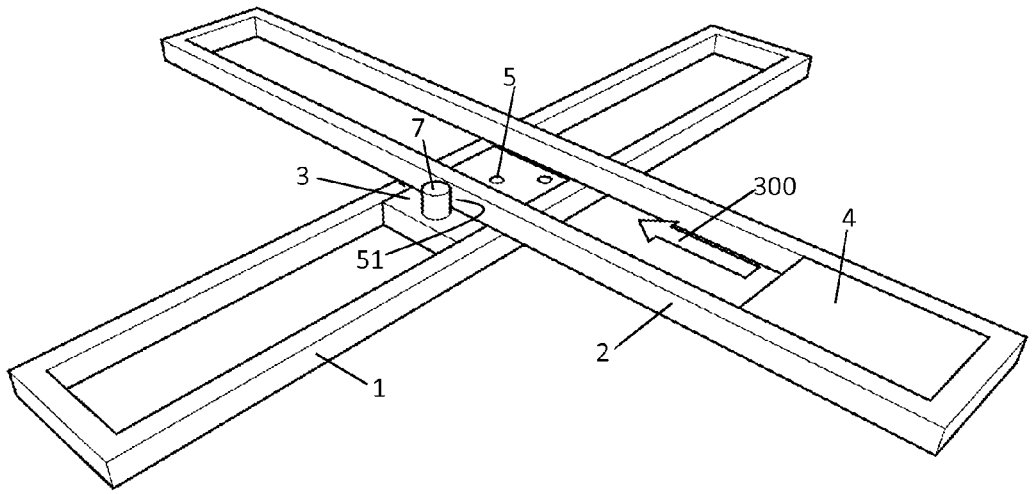
FIG. 4: View of Cross-Frames in engaged position and only one of the two connector blocks in engaged position.

As a first step—indicated by the motion arrow 100, the frame 1—along with its connector block 3, contacts 5 and stopper pin 7, is moved towards the frame 2 until the two frames make contact at three of the four locations marked 50 (see FIG. 3). The second step is indicated by the motion arrow 200 in FIG. 3 and comprises of moving the connector block 3 in its frame 1, till the stopper pin 7 is stopped by the frame 2. This is shown in FIG. 4 where the pin 7 is stopped by frame 2 at location marked 51. Notice that the electrical contacts 5 have arrived at a position that is accessible by the frame 2.

Figure 5:
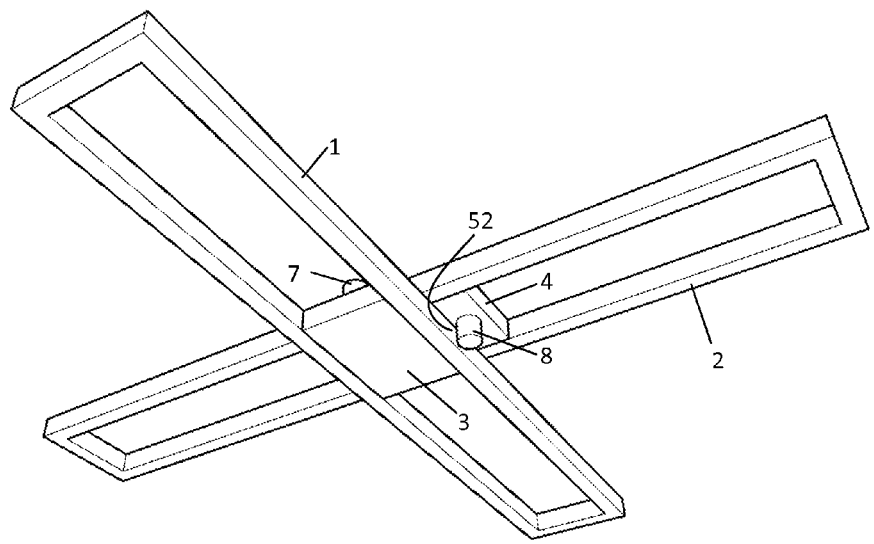
FIG. 5: View of Cross-Frames in engaged position and both connector blocks in engaged position.

The third motion is marked by motion arrow 300 in FIG. 4. This motion is to move the connector block 4 along frame 2 until the stopper pin 8 is stopped by frame 1 at location marked 52 (see FIG. 5). At this point the electrical contacts 5 and 6 have been correctly positioned so that they can make the electrical connection. This mechanism can establish a contact as long as the cross frames 1 and 2 have a cross point. The connection is also guaranteed for a reasonable yaw misalignment by making one of the contacts—either 5 or 6, bigger than the other. This takes care of four of the misalignments of the two objects on which frames 1 and 2 are mounted. These misalignments are—x (along the length of frame 1), y (along the length of frame 2), z (perpendicular to both frame 1 and 2) and yaw rotation in the x-y plane.

Figure 6:
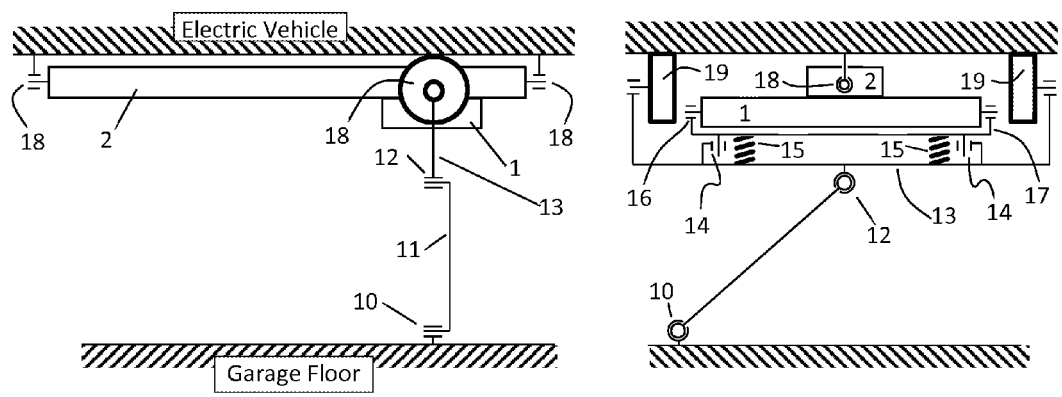
FIG. 6: Schematic of mechanism to engage the two cross frames.
Figure 7:
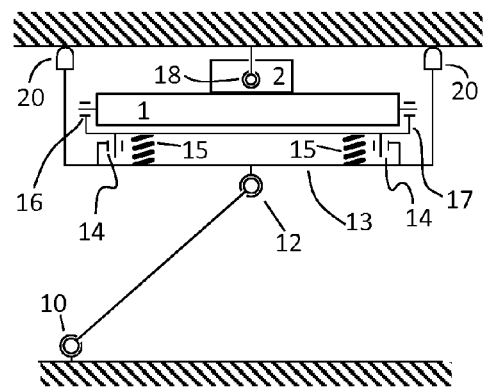
FIG. 7: Schematic of mechanism to engage the two cross frames.
Figures 8, 9:
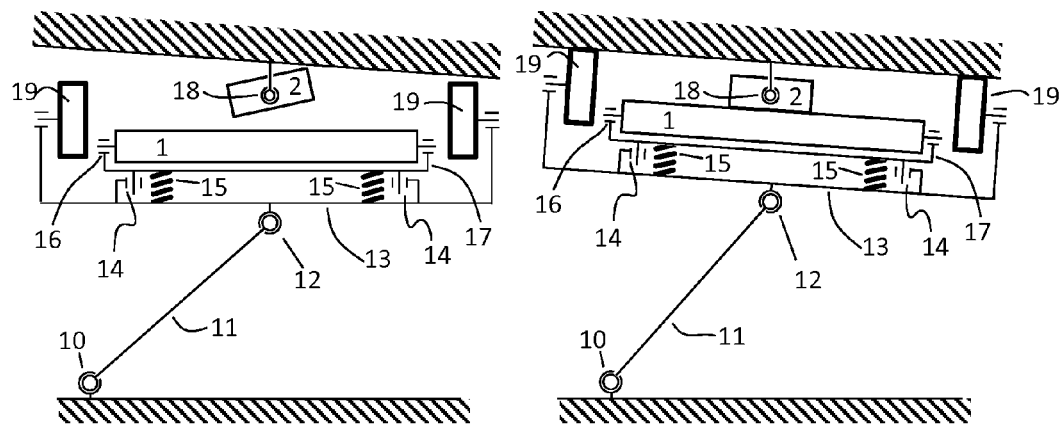
FIG. 8: Misaligned EV and cross frames in ready-to-engage position.
FIG. 9: Misaligned EV and cross frames in engaged position.
Figure 10:
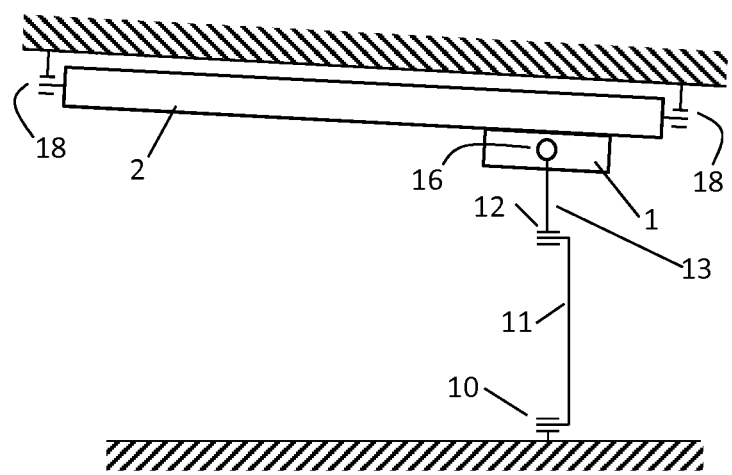
FIG. 10: Alternate view of misaligned EV and cross frames in engaged position.

Furthermore, FIG. 6 shows a mechanism to move the frame 1 to mate with the frame 2. As shown in FIG. 8, FIG. 9 and FIG. 10, this mechanism can compensate for the remaining two misalignments—roll (rotation along x axis) and pitch (rotation along y axis). In FIG. 6, the revolute joint 10 and link 11 enable motion 100. Prismatic joint 14 and springs 15 establish a predefined contact force between the interface of frames 1 and 2, while keeping the frame 1 parallel to the bracket 13. The bracket 13 is mounted on a revolute joint 12 and carries wheels 19. Alternatively, the wheels 19 can be replaced by alignment pins 20 as shown in FIG. 7 without altering the working of the mechanism. When the wheels 19 (or pins 20) touch a misaligned EV (see FIG. 8 which shows a EV with pitch misalignment), they force the revolute joint 12 to rotate and align the bracket 13 to the EV (FIG. 9). This in turn orients bracket 17—connected to bracket 13 by prismatic joint 14; to align with the EV. The alignment of bracket 17—as seen in the plane of FIG. 9; forces the alignment of frame 1 to the EV since frame 1 is connected to bracket 17 by revolute joint 16, whose axis lies in the plane of FIG. 9. The force of the springs 15, pushes the frame 1 against frame 2, which aligns the frame 2 to frame 1 by rotating it around the revolute joint 18.

For roll misalignment seen in FIG. 10, the revolute joint 16 offers the necessary degree of freedom to aligns the frame 1 to frame 2. In FIG. 10, please note that for the clarity of explanation, wheels 19 are not shown and the brackets 13 and 17 are shown as a single unit.

It is worth noting that the frame 1 and its connector block 3 have the same shape and features as frame 2 and its connector block 4. This similarity can be advantageously used to reduce the component count and make the entire system cheaper for mass production.

The proposed invention is thus capable of establishing a conductive electrical connection in the presence of all six degrees of misalignment. The electrical connection is achieved by a series of simple motions. Each of the motions terminates when a mechanical stop—put in place by its predecessor motion, is hit. It should be noted that the mechanical arrangement presented in this invention can also be made to work for inductive energy transfer by replacing the contacts 5 and 6 by inductive coils.

The invention claimed is:

1. An apparatus which electrically connects a first electrical contact on a first object to a second electrical contact on a second object, comprising:
    a first frame attached to the first object;
    a first carriage encompassed by the first frame, which includes the first electrical contact and has a single degree of freedom within the first frame,
    a second frame attached to the second object;
    a second carriage, encompassed by the second frame, which includes the second electrical contact and has a single degree of freedom within the second frame;
    a first stopper mounted on the first carriage that stops the first carriage when the first stopper contacts the second frame; and
    a second stopper mounted on the second carriage that stops the second carriage when the second stopper contacts the first frame;
    made by a process comprising:
    contacting the first frame and second frame;
    contacting the first stopper with the second frame, thus stopping further motion of the first carriage; and
    contacting the second stopper with the first frame, thus stopping further motion of the second carriage;
    thereby electrically connecting the first electrical contact with the second electrical contact.

2. The apparatus of claim 1, wherein the first and the second electrical contacts are replaced by a first and a second coil.

3. The apparatus of claim 1, wherein the first and the second stoppers are replaced by first and second proximity sensors.

4. The apparatus of claim 1, wherein the first and the second electrical contacts are replaced by first and second fluid transfer ports.

5. The apparatus of claim 1, wherein the first object is a garage floor and the second object is an electric vehicle.

6. An apparatus that aligns a first frame, which includes a first carriage with a first contact on a first object to a second frame, which includes a second carriage with a second contact on a second object, comprising:
    a first revolute joint attached to the first object, which is connected through a link to a second revolute joint;
    a first bracket, which includes a first and a second peg attached to the second revolute joint;
    a second bracket connected to the first bracket by a spring loaded prismatic joint;
    a third revolute joint connecting the second bracket and the first frame, with a revolute axis substantially perpendicular to the second revolute joint; and
    a fourth revolute joint connecting the second frame to the second object;
    wherein the first and the second pegs are in contact with the second object which aligns the first frame with the second frame and the first contact with the second contact.

7. The apparatus of claim 6 wherein the first and the second pegs are replaced by a first and a second aligning wheel.

8. An apparatus which electrically connects a first electrical contact on a first object to a second electrical contact on a second object, comprising:
    a first frame attached to the first object;
    a first carriage encompassed by the first frame which includes the first electrical contact and has a single degree of freedom within the first frame;
    a second frame attached to the second object;
    a second carriage encompassed by the second frame which includes the second electric contact and has a single degree of freedom within the second frame;
    a first stopper mounted on the first carriage that stops the first carriage when the first stopper contacts the second frame;
    a second stopper mounted on the second carriage that stops the second carriage when the second stopper contacts the first frame; and
    wherein the first and the second frames are in contact, the first stopper of the first carriage is in contact with the second frame, the second stopper of the second carriage is in contact with the first frame and the first electrical contact is electrically connected with the second electrical contact.

9. A method which electrically connects a first electric contact on a first object to a second electrical contact on a second object comprising:
- contacting a first frame attached to the first object and a second frame attached to the second object;
- contacting a first stopper mounted on a first carriage, which includes the first electric contact and is encompassed with a single degree of freedom by the first frame, with the second frame, thus stopping further motion of the first carriage;
- contacting a second stopper mounted on a second carriage, which includes the second electric contact and is encompassed with a single degree of freedom by the second frame, with the first frame, thus stopping further motion of the second carriage;
- thereby electrically connecting the first electrical contact with the second electrical contact.

* * * * *